United States Patent [19]

Inbar et al.

[11] Patent Number: 5,943,170
[45] Date of Patent: Aug. 24, 1999

[54] ADAPTIVE OR A PRIORI FILTERING FOR DETECTION OF SIGNALS CORRUPTED BY NOISE

[76] Inventors: Hanni Inbar, 32/36 Eilat, 58361 Holon; Emanuel Marom, 7 Andersen, 69107 Tel Aviv, both of Israel

[21] Appl. No.: 08/519,006

[22] Filed: Aug. 24, 1995

[30]     Foreign Application Priority Data

Aug. 25, 1994  [IL]  Israel ........................................ 110771

[51] Int. Cl.$^6$ ............................. G03B 21/56; G06E 3/00; G06F 17/10
[52] U.S. Cl. ......................... 359/561; 382/211; 364/822; 364/724.05
[58] Field of Search ..................... 359/561, 560, 359/564; 382/210–215; 364/822, 724.05

[56]                   References Cited

U.S. PATENT DOCUMENTS

| | | |
|---|---|---|
| 3,519,992 | 7/1970 | Rau . |
| 3,779,492 | 12/1973 | Grumet . |
| 3,947,123 | 3/1976 | Carlson et al. ............................ 356/71 |
| 4,067,645 | 1/1978 | Carlson et al. ........................... 359/564 |
| 4,084,255 | 4/1978 | Casasent et al. . |
| 4,185,168 | 1/1980 | Graupe et al. ............................ 381/68 |
| 4,209,780 | 6/1980 | Fenimore et al. . |
| 4,360,799 | 11/1982 | Leighty et al. . |
| 4,383,734 | 5/1983 | Huignard et al. . |
| 4,487,476 | 12/1984 | Hester et al. . |
| 4,596,036 | 6/1986 | Norgren et al. ........................... 382/129 |
| 4,723,222 | 2/1988 | Becker et al. . |
| 4,765,714 | 8/1988 | Horner et al. . |
| 4,990,925 | 2/1991 | Edelsohn et al. . |
| 5,040,140 | 8/1991 | Horner . |
| 5,054,097 | 10/1991 | Flinois et al. . |
| 5,111,515 | 5/1992 | Javidi . |
| 5,119,443 | 6/1992 | Javidi . |
| 5,148,316 | 9/1992 | Horner et al. ........................... 359/561 |
| 5,148,502 | 9/1992 | Tsujiuchi . |
| 5,151,822 | 9/1992 | Hekker et al. ........................... 382/210 |
| 5,175,775 | 12/1992 | Iwaki et al. . |
| 5,274,716 | 12/1993 | Mitsuoka et al. . |
| 5,276,636 | 1/1994 | Cohn . |
| 5,317,651 | 5/1994 | Refreqier et al. . |
| 5,453,844 | 9/1995 | George et al. ............................ 382/280 |
| 5,493,444 | 2/1996 | Khoury et al. ........................... 359/561 |
| 5,511,019 | 4/1996 | Grycewicz et al. ...................... 359/561 |
| 5,541,867 | 7/1996 | Corry et al. ........................... 364/724.19 |

OTHER PUBLICATIONS

"Optical Signal Processing", A. Vanderlugt John Wiley & Sons Ltd., pp. 236–237 (1962).
"Matched, phase–only, or Inverse Filtering with joint–Transform Correlators", H. Inbar et al, Optic Letters vol. 18 pp. 1657–1659 (1993).
O. K. Ersoy and M. Zeng, "Nonlinear matched filtering", J. Opt. Soc. Am., vol. 6, No. 5, pp. 636–647, May 1989.
C. S. Weaver and J. W. Goodman, "A technique for optically convolving two functions", Applied Optics, vol. 5, No. 7, pp. 1248–1249, Jul. 1966.
Carl W. Helstrom, "Image restoration by the method of least squares", J. Opt. Soc. Am., vol. 57, No. 3, pp. 297–303, Mar. 1967.
n: multicriteria optinization approach, Optics Letters, vol. 15, No. 15, pp. 854–856, Aug. 1990.
Bahram Javidi, Nonlinear joint power spectrum based optical correlation, Applied Optics, vol. 28, No. 12, pp. 2358–2366, Jun. 1989.
T. H. Chao et al, "Optimum correlation detection by pre–whitening", Applied Optics, vol. 19, No. 14, Jul. 1980, pp. 2461–2464 (364/822).

*Primary Examiner*—Jon W. Henry
*Attorney, Agent, or Firm*—Mark M. Friedman

[57]                    ABSTRACT

A method for pattern recognition and localization using a joint transform correlator and joint transform correlator. The method includes providing a joint image of a reference image and an input scene image at the input plane of the correlator, receiving the joint image and providing a Fourier transform interference field of the reference image and the input scene image, receiving the Fourier transform interference field and providing a joint power spectrum, compensating for noise prevailing within the input scene image by processing the joint power spectrum to produce a noise compensated joint power spectrum, and receiving the noise compensated joint power spectrum and providing a noise tolerant correlation signal so as to enhance pattern recognition and localization capabilities.

15 Claims, 8 Drawing Sheets

ADAPTIVE OR A PRIORI FILTERING FOR DETECTION OF SIGNALS CORRUPTED BY NOISE

FIELD AND BACKGROUND OF THE INVENTION

The present invention relates to pattern recognition and localization systems in general and, more particularly, to a priori and adaptive filtering for the detection of signals corrupted by noise. The pattern recognition and localization systems can be realized within a joint transform correlator architecture or within a frequency plane correlator architecture.

Broadly speaking, pattern recognition and localization systems are utilized for providing information regarding an input scene image with respect to a reference image. Pattern recognition and localization systems can be implemented by an all optical configuration, by a hybrid opto-electronic configuration as well as by electronic fully-digital processing apparatus as known in the art. For a discussion on the different configurations of pattern recognition and localization systems, reference is made to "Optical Signal Processing" by A. VanderLugt, John Wiley & Sons Ltd., 1992 which is incorporated herein by reference as if fully set forth herein. These systems are valuable tools used in a wide range of applications, including: machine vision, robotics, automation, surveillance systems, control of manufacturing processes, photogrammetry, and the like.

In principle, pattern recognition and localization architectures can be classified as either frequency plane correlators (FPCs) or as joint transform correlators (JTCs). The classification depends on the sequence and form in which the reference image, against which the input scene image is to be compared, is introduced into the filtering scheme.

The first known correlation architecture is the Frequency Plane Correlator (FPC). Up to the present time, there have been a number of designs of frequency plane masks for frequency plane correlators to accomplish pattern recognition and localization in a wide range of applications. These include the Classical Matched filter, Inverse filter, and Phase only filter as described in the above-mentioned reference: "Optical Signal Processing". Other filters include Nonlinear filters as described in an article entitled "Nonlinear Matched Filtering", by O. K. Ersoy and M. Zeng, J. Opt. Soc. Am. A. 6, 636–648 (1989).

It is well known that the Classical Matched filter is the optimum linear filter for extracting a known two-dimensional signal from additive, signal independent, stationary random noise by maximizing the detection Signal-to-Noise Ratio (SNR). The Classical Matched filter function for FPCs is $R^*(u,v)/P_n(u,v)$ where $R(u,v)$ is the Fourier transform of the reference image, $P_n(u,v)$ is a known a priori noise power spectral density and the asterisk $^*$ signifies a complex-conjugate operation. Overall, the cross correlation term of FPCs in the Classical Matched filter configuration is $R^*(u,v)S(u,v)/P_n(u,v)$ where $S(u,v)$ is the Fourier transform of the input scene image. However, the Classical Matched filter, as well as other designs mentioned hereinabove, suffer from a number of disadvantages which include that they do not provide a balanced trade-off between noise tolerance and peak sharpness which may be desirable for certain applications.

An alternative frequency plane mask design is the Wiener filter or more generally the parametric Wiener filter. Originally, Wiener filters were developed for image restoration in situations where an image was blurred and then corrupted by additive noise. The restoration of images was treated as the problem of finding an estimate that is a linear function of the data and minimizes the mean squared error between the true solution and itself, as described, for example, in an article entitled "Image restoration by the method of least squares" by C. W. Helstrom, J. Opt. Soc. Am. 57, 297–303 (1967).

It is well known that parametric Wiener filters, when used as frequency plane masks for FPCs, are particularly applicable for situations where a balanced trade-off between noise tolerance and peak sharpness, as reflected by the metrics Signal-to-Noise-Ratio and Peak-to-Correlation Energy Ratio, respectively, is required, as described in the article entitled "Filter design for optical pattern recognition: multi-criteria optimization approach" by Ph. Réfrégier, Optics Letters 15, 854–856 (1990). The Wiener filter function for FPCs is $R^*(u,v)/[|R(u,v)|^2+P_n(u,v)]$ whereas the parametric Wiener filter function for FPCs is $R^*(u,v)/[|R(u,v)|^2+\gamma P_n(u,V)]$ where $\gamma$ is the filtering parameter. Overall, the cross correlation term of FPCs employing a Wiener filter is $R^*(u,v)S(u,v)/[|R(u,v)|^2+P_n(u,v)]$ whereas the cross correlation term of FPCs when employing a parametric Wiener filter is $R^*(u,v)S(u,v)/[|R(u,v)|^2+\gamma P_n(u,v)]$. It should be noted that both of these filter designs, as well as the Classical Matched filter, suffer from the disadvantage of their inability to compensate in the filtering process for input-additive random noise with an unknown a priori power spectral density in an adaptive manner.

The second correlation architecture is the so called Joint Transform Correlator (JTC) as described in an article entitled "A technique for optically convolving two functions", by C. S. Weaver & J. W. Goodman, Appl. Opt. 5, 1248–1249 (1966). Up to the present time there have been a number of designs of joint transform correlator configurations to deal with a wide range of applications. These include the nonlinear JTC described in U.S. Pat. No. 5,119,443 to Javidi and in the article entitled "Non-linear joint power spectrum based optical correlation" by B. Javidi, Appl. Opt. 28, 2358–2367 (1989), the fractional power joint transform correlator as described in an article entitled "Matched, phase only, or inverse filtering with joint-transform correlators" by H. Inbar & E. Marom, Optics Letters 18, 1657–1659 (1993) and the like. However, these designs suffer from a number of disadvantages which include that they are unable to compensate for colored noise inherent in an input scene image. This is true for cases where the noise power spectral density is either known or unknown a priori.

There is therefore a need for a number of novel filtering schemes for JTCs which are particularly suitable for compensating for stationary input-additive noise characterized by a wide range of a priori known power spectral densities ranging from white noise to colored noise models. Furthermore, there is a need for novel filtering schemes, for both FPCs and JTCs, which are adaptive to the random noise present in input scene images in cases where the noise power spectral density is unknown a priori.

SUMMARY OF THE INVENTION

The present invention is for pattern recognition and localization systems in general and more particularly to enable a priori and adaptive filtering for the detection of signals corrupted by noise. The pattern recognition and localization systems can be realized within a joint transform correlator (JTC) architecture or a frequency plane correlator (FPC) architecture.

Hence, with respect to the first aspect of the present invention, there is provided a joint transform correlator for pattern recognition and localization, the correlator comprising: (a) image providing means for providing a joint image of a reference image and an input scene image at the input plane of the correlator; (b) first Fourier transform means for receiving the joint image and for providing a Fourier transform interference field of the reference image and the input scene image; (c) square law means for receiving the Fourier transform interference field and for providing a joint power spectrum; (d) noise compensation means for compensating for noise prevailing within the input scene image by processing the joint power spectrum to produce a noise compensated joint power spectrum; and (e) second Fourier transform means for receiving the noise compensated joint power spectrum and for providing a noise tolerant correlation signal so as to enhance pattern recognition and localization capabilities.

According to a further feature of the present invention, the noise compensation means provides processing of the joint power spectrum according to a Classical Matched filtering scheme.

According to a still further feature of the present invention, the Classical Matched filtering scheme compensates for noise with a known a priori power spectral density.

According to a yet still further feature of the present invention, the Classical Matched filtering scheme compensates for noise through adaptive estimation of an unknown a priori noise power spectral density.

According to a yet still further feature of the present invention, the Classical Matched filtering scheme includes estimating the unknown a priori noise power spectral density using one estimator selected from the group of estimators consisting of: $<I(u,v)-2|R(u,v)|^2>$, $<|S(u,v)|^2-|R(u,v)|^2>$ and $|S(u,v)|^2-|R(u,v)|^2$.

According to a yet still further feature of the present invention, the noise compensation means provides processing of the joint power spectrum according to a Wiener filtering scheme.

According to a yet still further feature of the present invention, the Wiener filtering scheme compensates for noise with a known a priori power spectral density.

According to a yet still further feature of the present invention, the Wiener filtering scheme compensates for noise through adaptive estimation of a distribution including an unknown a priori noise power spectral density.

According to a yet still further feature of the present invention, the Wiener filtering scheme includes estimating the distribution using one estimator selected from the group of estimators consisting of: $<I(u,v)-|R(u,v)|^2>$, $|R(u,v)|^2+<I(u,v)-2|R(u,v)|^2>$, $<|S(u,v)|^2>$, and $|S(u,v)|^2$.

According to a yet still further feature of the present invention, the noise compensation means provides processing of the joint power spectrum according to a parametric Wiener filtering scheme.

According to a yet still further feature of the present invention, the parametric Wiener filtering scheme compensates for noise with a known a priori power spectral density.

According to a yet still further feature of the present invention, the parametric Wiener filtering scheme compensates for noise through adaptive estimation of a distribution including an unknown a priori noise power spectral density.

According to a yet still further feature of the present invention, the parametric Wiener filtering scheme includes estimating the distribution using one estimator selected from the group of estimators consisting of: $|R(u,v)|^2+\gamma<I(u,v)-2|R(u,v)|^2>$, $|R(u,v)|^2+\gamma<|S(u,v)|^2-|R(u,v)|^2>$, and $|R(u,v)|^2+\gamma(|S(u,v)|^2-|R(u,v)|^2)$.

According to a yet still further feature of the present invention, the correlator is implemented as an all-optical system.

According to a yet still further feature of the present invention, the correlator is implemented as a hybrid opto-electronic system.

According to a yet still further feature of the present invention, the correlator is implemented as an electronic fully-digital system.

There is also provided according to a second aspect of the present invention, a frequency plane correlator for pattern recognition and localization, the correlator comprising: (a) an image providing means for providing an input scene image at the input plane of the correlator; (b) first Fourier transform means for receiving the input scene image and for providing a Fourier transform of the input scene image; (c) adaptive frequency plane mask means for compensating for noise prevailing within the input scene image, the adaptive frequency plane mask means receiving the Fourier transform and providing a noise compensated Fourier plane product of the Fourier transform and the adaptive frequency plane mask means; and (d) second Fourier transform means for receiving the noise compensated product and for providing a noise tolerant correlation signal so as to enhance pattern recognition and localization capabilities.

According to a further feature of the present invention, the adaptive frequency plane mask means compensates for noise with an unknown a priori power spectral density according to a Classical Matched filtering scheme through adaptive estimation of the unknown a priori noise power spectral density.

According to a still further feature of the present invention, the Classical Matched filtering scheme includes estimating the unknown a priori noise power spectral density using one estimator selected from the group of estimators consisting of: $<|S(u,v)|^2-|R(u,v)|^2>$ and $|S(u,v)|^2-|R(u,v)|^2$.

According to a yet still further feature of the present invention, the adaptive frequency plane mask means compensates for noise with an unknown a priori power spectral density according to a Wiener filtering scheme through adaptive estimation of a distribution including the unknown a priori noise power spectral density.

According to a yet still further feature of the present invention, the Wiener filtering scheme includes estimating the distribution using one estimator selected from the group of estimators consisting of: $<|S(u,v)|^2>$ and $|S(u,v)|^2$.

According to a yet still further feature of the present invention, the adaptive frequency plane mask means compensates for noise with an unknown a priori power spectral density according to a parametric Wiener filtering scheme through adaptive estimation of a distribution including the unknown a priori noise power spectral density.

According to a yet still further feature of the present invention, the parametric Wiener filtering scheme includes estimating the distribution using one estimator selected from the group of estimators consisting of: $|R(u,v)|^2+\gamma<|S(u,v)|^2-|R(u,v)|^2>$ and $|R(u,v)|^2+\gamma(|S(u,v)|^2-|R(u,v)|^2)$.

According to a yet still further feature of the present invention, the correlator is implemented as an all-optical system.

According to a yet still further feature of the present invention, the correlator is implemented as a hybrid opto-electronic system.

According to a yet still further feature of the present invention, the correlator is implemented as an electronic fully-digital system.

There is also provided according to a third aspect of the present invention, a method for pattern recognition and localization using a joint transform correlator, the method comprising the steps of: (a) providing a joint image of a reference image and an input scene image at the input plane of the correlator; (b) receiving the joint image and providing a Fourier transform interference field of the reference image and the input scene image; (c) receiving the Fourier transform interference field and providing a joint power spectrum; (d) compensating for noise prevailing within the input scene image by processing the joint power spectrum to produce a noise compensated joint power spectrum; and (e) receiving the noise compensated joint power spectrum and providing a noise tolerant correlation signal so as to enhance pattern recognition and localization capabilities.

According to a further feature of the present invention, the step of compensating for noise includes the step of processing the joint power spectrum according to a Classical Matched filtering scheme.

According to a still further feature of the present invention, the Classical Matched filtering scheme compensates for noise with a known a priori power spectral density.

According to a yet still further feature of the present invention, the Classical Matched filtering scheme compensates for noise through adaptive estimation of an unknown a priori noise power spectral density.

According to a yet still further feature of the present invention, the Classical Matched filtering scheme includes estimating the unknown a priori noise power spectral density using one estimator selected from the group of estimators consisting of: $<I(u,v)-2|R(u,v)|^2>$, $<|S(u,v)|^2-|R(u,v)|^2>$ and $|S(u,v)|^2-|R(u,v)|^2$.

According to a yet still further feature of the present invention, the step of compensating for noise includes the step of processing the joint power spectrum according to a Wiener filtering scheme.

According to a yet still further feature of the present invention, the Wiener filtering scheme compensates for noise with a known a priori power spectral density.

According to a yet still further feature of the present invention, the Wiener filtering scheme compensates for noise through adaptive estimation of a distribution including an unknown a priori noise power spectral density.

According to a yet still further feature of the present invention, the Wiener filtering scheme includes estimating the distribution using one estimator selected from the group of estimators consisting of: $<I(u,v)-|R(u,v)|^2>$, $|R(u,v)|^2+<I(u,v)-2|R(u,v)|^2>$, $<|S(u,v)|^2>$, and $|S(u,v)|^2$.

According to a yet still further feature of the present invention, the step of compensating for noise includes the step of processing the joint power spectrum according to a parametric Wiener filtering scheme.

According to a yet still further feature of the present invention, the parametric Wiener filtering scheme compensates for noise with known a priori power spectral density.

According to a yet still further feature of the present invention, the parametric Wiener filtering scheme compensates for noise through adaptive estimation of a distribution including an unknown a priori noise power spectral density.

According to a yet still further feature of the present invention, the parametric Wiener filtering scheme includes estimating the distribution using one estimator selected from the group of estimators consisting of: $|R(u,v)|^2+\gamma<I(u,v)-2|R(u,v)|^2>$, $|R(u,v)|^2+\gamma<|S(u,v)|^2-|R(u,v)|^2>$, and $|R(u,v)|^2+\gamma(|S(u,v)|^2-|R(u,v)|^2)$.

According to a yet still further feature of the present invention, the method implemented on an all-optical system.

According to a yet still further feature of the present invention, the method implemented on a hybrid opto-electronic system.

According to a yet still further feature of the present invention, the method implemented on an electronic fully-digital system.

There is also provided according to a fourth aspect of the present invention, a method for pattern recognition and localization using a frequency plane correlator, the method comprising the steps of: (a) providing an input scene image at the input plane of the correlator; (b) receiving the input scene image and providing a Fourier transform of the input scene image; (c) compensating for noise prevailing within the input scene image using an adaptive frequency plane mask, the adaptive frequency plane mask receiving the Fourier transform and providing a noise compensated Fourier plane product of the Fourier transform and the adaptive frequency plane mask; and (d) receiving the noise compensated product and providing a noise tolerant correlation signal so as to enhance pattern recognition and localization capabilities.

According to a further feature of the present invention, the step of compensating for noise compensates for noise with an unknown a priori power spectral density according to a Classical Matched filtering scheme through adaptive estimation of the unknown a priori noise power spectral density.

According to a still further feature of the present invention, the Classical Matched filtering scheme includes estimating the unknown a priori noise power spectral density using one estimator selected from the group of estimators consisting of: $<|S(u,v)|^2-|R(u,v)|^2>$ and $|S(u,v)|^2-|R(u,v)|^2$.

According to a yet still further feature of the present invention, the step of compensating for noise compensates for noise with an unknown a priori power spectral density according to a Wiener filtering scheme through adaptive estimation of a distribution including the unknown a priori noise power spectral density.

According to a yet still further feature of the present invention, the Wiener filtering scheme includes estimating the distribution using one estimator selected from the group of estimators consisting of: $<|S(u,v)|^2>$ and $|S(u,v)|^2$.

According to a yet still further feature of the present invention, the step of compensating for noise compensates for noise with an unknown a priori power spectral density according to a parametric Wiener filtering scheme through adaptive estimation of a distribution including the unknown a priori noise power spectral density.

According to a yet still further feature of the present invention, the parametric Wiener filtering scheme includes estimating the distribution using one estimator selected from the group of estimators consisting of: $|R(u,v)|^2+\gamma<|S(u,v)|^2-|R(u,v)|^2>$ and $|R(u,v)|^2+\gamma(|S(u,v)|^2-|R(u,v)|^2)$.

According to a yet still further feature of the present invention, the method implemented on an all-optical system.

According to a yet still further feature of the present invention, the method implemented on a hybrid opto-electronic system.

According to a yet still further feature of the present invention, the method implemented on an electronic fully-digital system.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of pattern recognition and localization systems which can be readily implemented as all-optical, hybrid opto-electronic and fully digital configurations. The pattern recognition and localization systems of the present invention include both joint transform correlator configurations and frequency plane correlator configurations. All the above configurations: all-optical, hybrid opto-electronic and fully digital can be equally applied to the filtering of One-Dimensional (1D) and Two-Dimensional (2D) information. Information is also commonly referred to as either signals or images.

The principles and operation of the pattern recognition and localization systems according to the present invention may be better understood with reference to the drawings and the accompanying description.

Broadly speaking, the present invention provides a number of novel filtering schemes which are particularly suitable for compensating for input-additive noise. The novel filtering schemes can be adapted for integration with both joint transform correlator configurations and frequency plane correlator configurations. In particular, the novel filtering schemes of the present invention can be classified as belonging to either the Classical Matched filtering schemes, the Wiener filtering schemes or the parametric Wiener filtering schemes.

The following notation is used when processing 2D information using the novel filtering schemes of the present invention while similar notation should be used when processing 1D information:

1) $R(u,v)$ is the Fourier transform (FT) of the reference image $r(x,y)$;

2) $|R(u,v)|^2$ is the power spectrum of the reference image $r(x,y)$;

3) $N(u,v)$ is the Fourier transform of the input-additive noise $n(x,y)$;

4) $P_n(u,v)$ is the noise power spectral density where $P_n(u,v)=\overline{|N(u,v)|^2}$ the overline (or overbar) signifies an ensemble averaging operation;

5) $S(u,v)$ is the Fourier transform of the input scene image $s(x,y)$ where it is assumed that $s(x,y)=r(x,y)+n(x,y)$;

6) $|S(u,v)|^2$ is the power spectrum of the input scene image $s(x,y)$;

7) the asterisk * signifies a complex-conjugate operation;

8) the use of angle brackets < > signifies a local spatial averaging operation performed over sub-areas of a plane of interest;

9) "a priori" is used to identify cases where the noise power spectral density $P_n(u,v)$ is known in advance;

10) "adaptive" is used to identify cases where the noise power spectral density $P_n(u,v)$ is estimated from captured data in optical configurations or from calculated data in digital configurations; and 11) $\gamma$ is the filtering parameter of parametric Wiener filtering.

For the sake of exposition, it has been assumed that the noise $n(x,y)$ is a stationary random process independent of the input scene object as well known in the art of signal processing. The noise can have either a zero mean or a non zero mean. Non zero mean noise can be regarded as a zero mean noise on a constant (DC) level as also well known in the art. However, it should be appreciated that the teachings of the present invention may also be applied to signals corrupted by other types of noise models.

Figure 1:
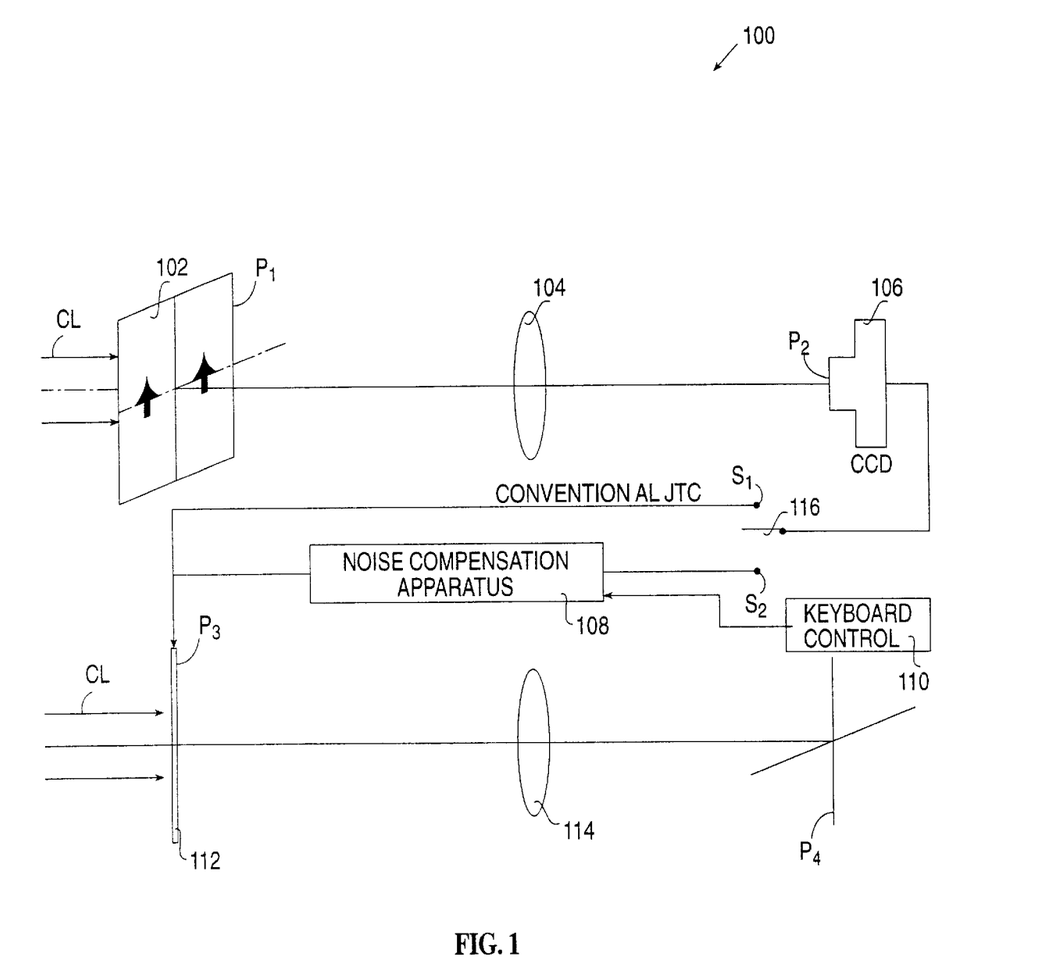
FIG. 1 is a schematic illustration of a preferred embodiment of a hybrid opto-electronic joint transform correlator pattern recognition and localization system constructed and operative according to the teachings of the present invention.

Referring now to the drawings, FIG. 1 illustrates a preferred embodiment of a hybrid opto-electronic joint transform correlator pattern recognition and localization system, generally designated 100, constructed and operative according to the teachings of the present invention. Plane $P_1$ is the input plane of JTC system 100 at which a spatial light modulator (SLM) 102 is employed for displaying a reference image and an input scene image. For the sake of exposition only, the reference image and the input scene image are depicted as aircraft. Other typical reference and input scene 2D images include, but are not limited to, industrial objects, characters and the like. Similarly, 1D information can include, but is not limited to, time signals, for example, speech, video signals, and spatial signals, for example, Barcode signals, and the like.

The reference image and the input scene image are illuminated on SLM 102 by coherent light CL to provide a joint image. The reference image and input scene image are denoted by $r(x+x_0,y)$ and $s(x-x_0,y)$, respectively, because they are separated by $2x_0$. The joint image is Fourier transformed by a Fourier transform device 104 to provide a Fourier transform interference field of the joint image at a plane $P_2$. Fourier transform device 104 is preferably an optical lens. An opto-electronic image sensor 106, such as a charge coupled array or device CCD, is deployed at plane $P_2$ to receive the Fourier transform interference field. Opto-electronic image sensor 106 acts as a Square Law Device for producing a joint power spectrum $I(u,v)$ from the Fourier transform interference field of the joint image. The joint power spectrum $I(u,v)=|R(u,v)|^2+|S(u,v)|^2+R^*(u,v)S(u,v)\exp[-i2\phi(u)]+R(u,v)S^*(u,v)\exp[i2\phi(u)]$ where $\phi(u)=2\pi ux_0/(\lambda f)$, f is the focal length of Fourier transform device 104 and $\lambda$ is the wavelength of the illuminating coherent light.

It is a particular feature of the present invention that the joint power spectrum is fed to a noise compensation apparatus 108 for compensating for noise prevailing within the input scene image to provide a noise compensated joint power spectrum. Noise compensation apparatus 108 is preferably implemented as a software package or a dedicated hardware component. Generally, noise compensation apparatus 108 includes a keyboard control interface 110. In addition, system 100 is typically provided with a double-throw switch 116 enabling a conventional JTC configuration when deployed in position denoted $S_1$ and the novel JTC configuration when deployed in position denoted $S_2$. Double-throw switch 116 can be realized in software.

The processing performed by noise compensation apparatus 108 depends on a number of factors as follows. First, whether the power spectral density $P_n(u,v)$ of the noise prevailing in the input scene image is known a priori or is unknown a priori. Second, the preferred correlation performance criteria, for example, noise tolerance, peak sharpness, light efficiency, and the like. And third, the application at hand as well as the available processing time, means, etc.

According to the teachings of the present invention, several novel filtering schemes for compensating for noise prevailing within the input scene image are proposed as will be described hereinbelow in greater detail. Broadly speaking, the filtering schemes can be classified as providing processing according to a Classical Matched filtering scheme, a Wiener filtering scheme or a parametric Wiener filtering scheme. Furthermore, some of the novel filtering schemes treat noise with known a priori power spectral density while others treat noise with unknown a priori power spectral density.

The noise compensated joint power spectrum distribution is fed to a second SLM 112 which displays, through illumination by coherent light CL, the noise compensated joint power spectrum at a plane $P_3$. The noise compensated joint power spectrum is Fourier transformed by a Fourier transform device 114 to provide an output signal including a correlation signal at a plane $P_4$. Again, Fourier transform device 114 is preferably an optical lens.

Figure 2:
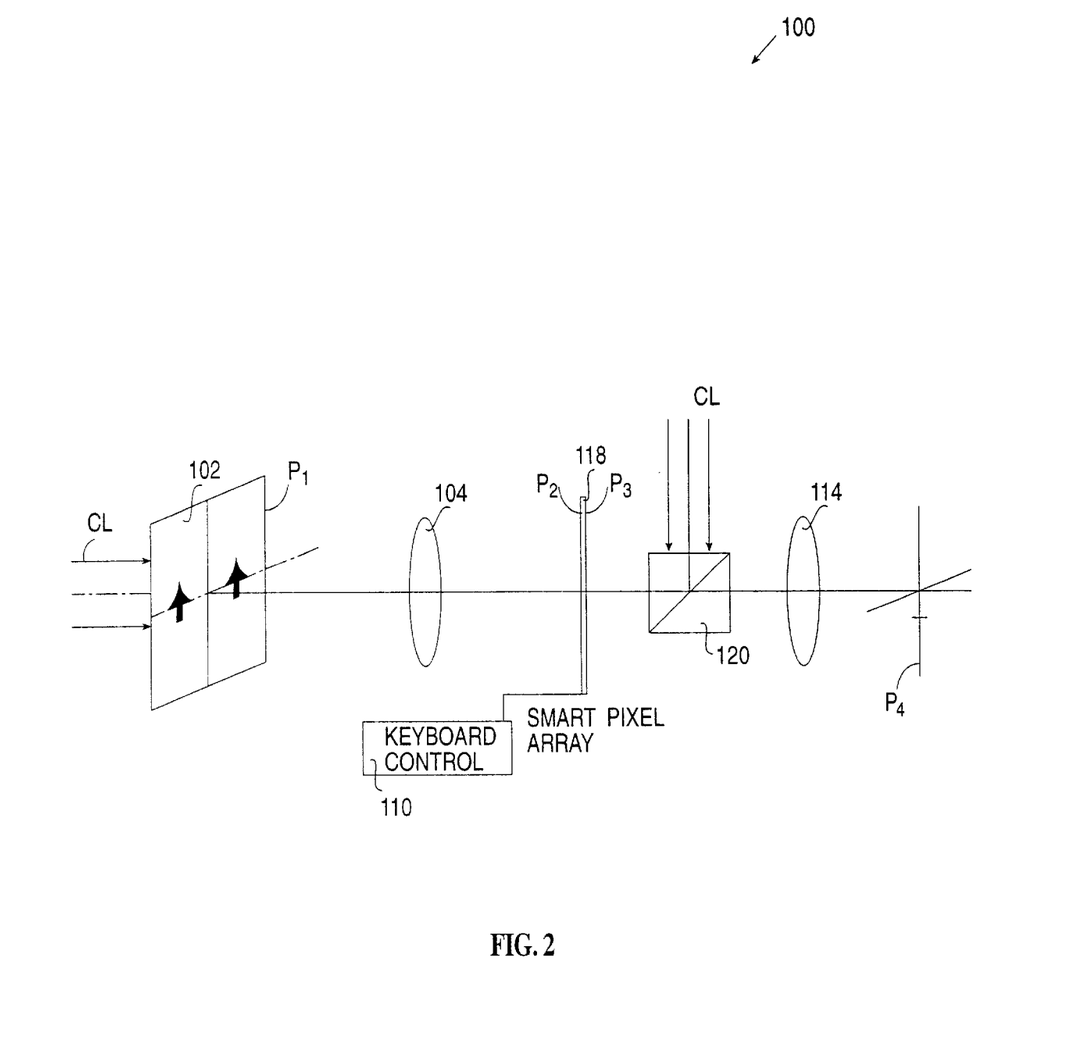
FIG. 2 is a schematic illustration of a second embodiment of the hybrid opto-electronic joint transform correlator pattern recognition and localization system of FIG. 1.

Turning now to FIG. 2, JTC pattern recognition and localization system 100 includes a reflection reading mode smart pixel array 118 to replace square law opto-electronic device 106, noise compensation apparatus 108 and SLM 112. A general description of smart pixel arrays is provided in an article entitled "Smart Spatial Light Modulators using Liquid Crystals on Silicon", by K. M. Johnson, D. J. McKnight and I. Underwood, IEEE J. Quantum Electron. 29, 699–714 (1993) which is included by reference as if set forth fully herein. In system 100 of FIG. 2, a beam splitter 120 is deployed between smart pixel array 118 and Fourier transform device 114 for illuminating the front surface of smart pixel array 118 with coherent light CL such that the noise compensated joint power spectrum is displayed at plane $P_3$.

Figure 3:
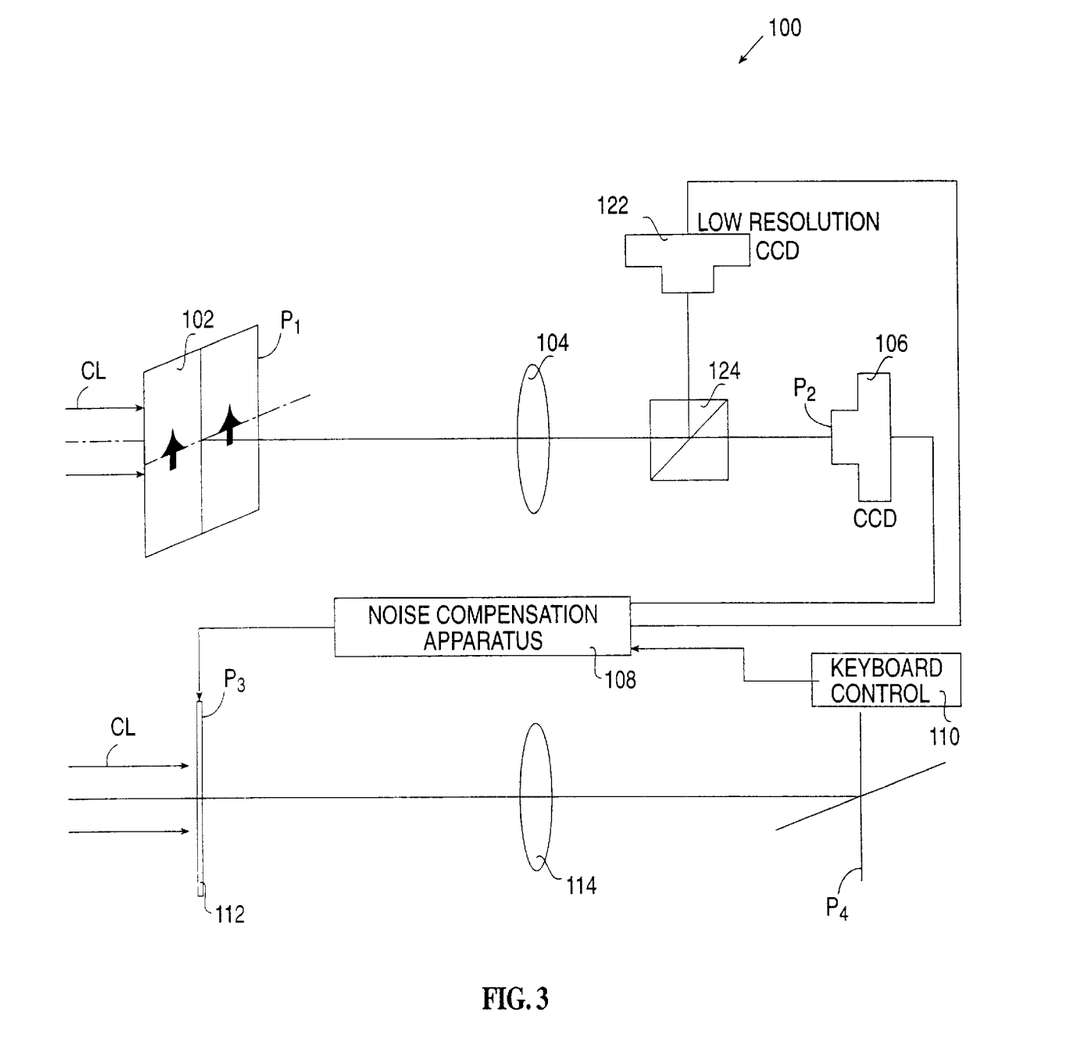
FIG. 3 is a schematic illustration of a third embodiment of the hybrid opto-electronic joint transform correlator pattern recognition and localization system of FIG. 1.

Turning now to FIG. 3, JTC pattern recognition and localization system 100 further includes a low resolution CCD 122 in the focal plane of Fourier transform device 104 and a beam splitter 124 deployed between Fourier transform device 104 and opto-electronic image sensor 106. Low resolution CCD 122 provides local spatial averaging of power spectra $|S(u,v)|^2$, $|R(u,v)|^2$ and $I(u,v)$ to noise compensation apparatus 108 as required for the adaptive filtering schemes of the present invention. In addition, further smoothing of the local spatial averaged function can be achieved by noise compensation apparatus 108 in order to achieve a better smoothed version of the power spectra $|S(u,v)|^2$, $|R(u,v)|^2$ and $I(u,v)$.

Alternatively, a defocusing sub-system (not shown) can replace CCD 122 for providing the local spatial averaging of power spectra $|S(u,v)|^2$, $|R(u,v)|^2$ and $I(u,v)$. Such a sub-system may require additional components including a fine-ground glass. For further description of a defocusing sub-system, refer to an article entitled "Method for multi-level threshold of binarization in a hybrid joint Fourier transform correlator" by Q. Zhan et al., Appl. Opt. 32, 5786–5788 (1993) which is included by reference as if set forth fully herein.

Figure 4:
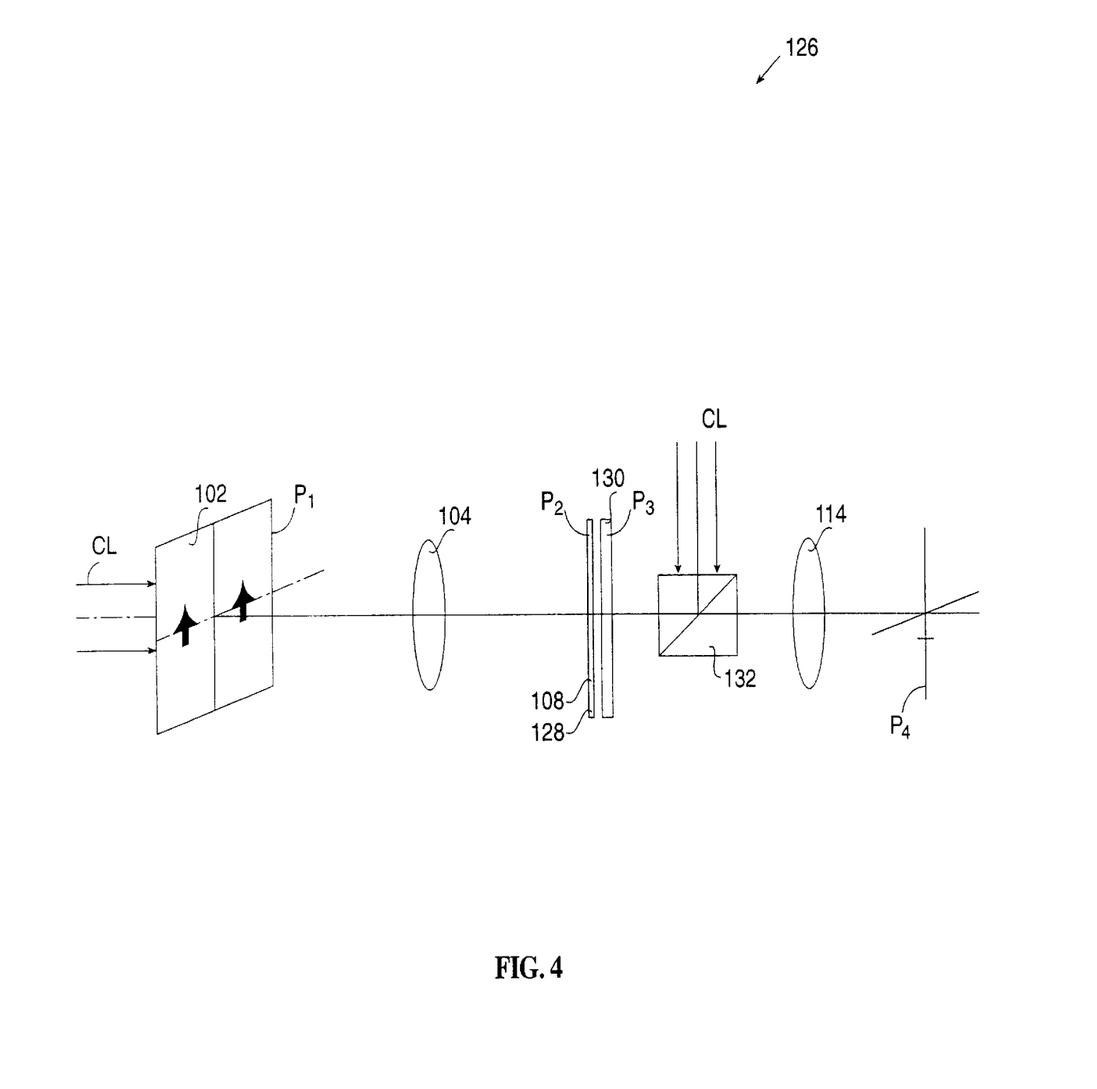
FIG. 4 is a schematic illustration of a preferred all optical implementation of a joint transform correlator pattern recognition and localization system constructed and operative according to the teachings of the present invention.

Turning now to FIG. 4, the schematic illustration depicts an all-optical implementation of a JTC pattern recognition and localization system, generally designated 126, constructed and operative according to the teachings of the present invention. System 126 is applicable only for particular estimators of the adaptive filtering schemes of the present invention as described hereinbelow and for cases when the noise power spectral density $P_n(u,v)$ is known a priori.

System 126 employs noise compensation apparatus 108 in the form of a photographic film, additionally designated 128 for the sake of clarity, and a Liquid Crystal Light Valve (LCLV) 130 deployed at the focal plane of Fourier transform device 104. Photographic film 128 is preferably of appropriate contrast such that its amplitude transmittance is proportional to the reciprocal of incident recording light intensity. In system 126, a beam splitter 132 is deployed between LCLV 130 and Fourier transform device 114 for illuminating the front surface of LCLV 130 with coherent light CL in order to pick up the noise compensated joint power spectrum displayed at plane $P_3$. Alternatively, LCLV 130 can be replaced by a CCD and an electrically addressed reflection reading mode SLM as known in the art. It should be noted that using a transmission reading mode SLM illuminated by normally incident coherent light instead of the reflection reading mode SLM obviates the need for beam splitter 132. For reasons to become apparent hereinbelow, film 128 is prepared in advance for compensating for noise prevailing in an input scene image.

Figure 5:
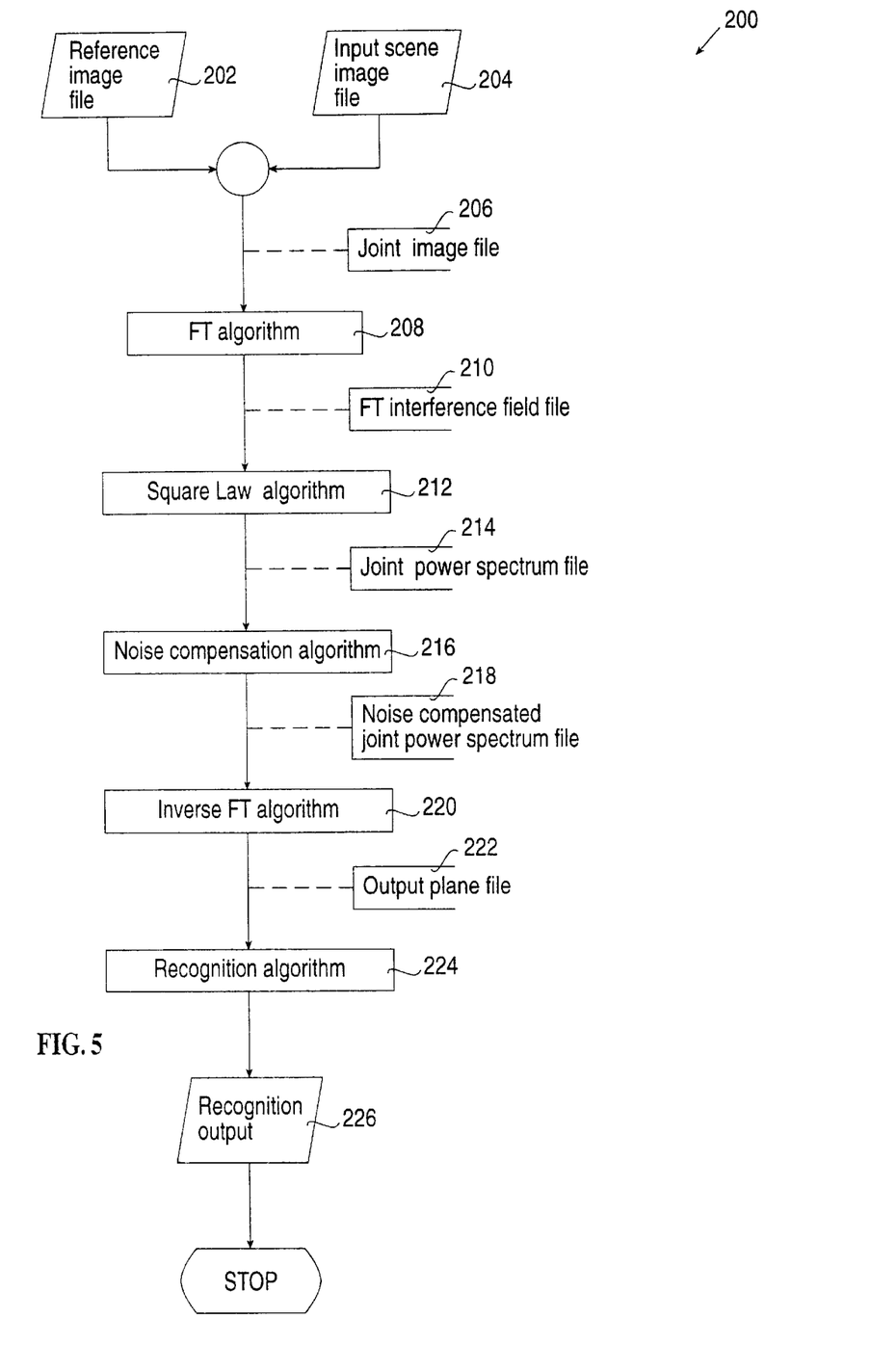
FIG. 5 is a block diagram of a preferred fully digital implementation of a joint transform correlator pattern recognition and localization system constructed and operative according to the teachings of the present invention.

With reference now to FIG. 5, the flow chart shows a digital implementation of a joint transform correlator pattern recognition and localization system, generally designated 200, constructed and operative according to the teachings of the present invention. In principle, as will be described in greater detail hereinbelow, the optical components, opto-electronic components, electro-optic components and electronic components of system 100 of FIG. 1 are implemented as algorithms while images, functions and distributions are provided as digital files. As well known in the art, the algorithms can be provided as software packages or as hardware components.

Hence, the reference image and the input scene image are provided as digital files 202 and 204, respectively, which are combined to provide a Joint Image file 206. Typically, Joint Image file 206 is zero padded to provide blank spaces surrounding the reference image and the input scene image. Joint Image file 206 is fed to a Fourier Transform algorithm 208 which processes Joint Image file 206 to provide a Fourier Transform Interference Field file 210. Fourier Transform Interference Field file 210 is fed to a Square Law algorithm 212 to provide a Joint Power Spectrum file 214. Basically speaking, Square Law algorithm 212 processes Fourier Transform Interference Field file 210 to provide the absolute value square of the Fourier transform interference field. Hence, as before, the joint power spectrum $I(u,v)=|R(u,v)|^2+|S(u,v)|^2+R^*(u,v)S(u,v)\exp[-i2\phi(u)]+R(u,v)S^*(u,v)\exp[i2\phi(u)]$ where $\phi(u)=2\pi u x_0/(\lambda f)$ where, in this case, both f and $\lambda$ are arbitrarily selected values.

In a similar fashion to system 100 of FIG. 1, Joint Power Spectrum file 214 is fed to a Noise Compensation algorithm 216 for processing to provide a Noise Compensated Joint Power Spectrum file 218. Typically, Noise Compensation algorithm 216 includes one or more sub-routines for providing the desired compensation factor. Noise Compensation algorithm 216 also ensures that Noise Compensated Joint Power Spectrum file 218 does not include singular values resulting from a division operation included in the algorithm.

Noise Compensated Joint Power Spectrum file 218 is fed to an Inverse Fourier Transform algorithm 220 to provide an Output Plane file 222 which includes pattern recognition and localization information. Output Plane file 222 is typically analyzed by a Recognition algorithm 224 which is designed to detect correlation signals and localize correlation peaks, thus providing a recognition output 226.

The novel filtering schemes of the present invention as implemented by noise compensation apparatus 108, smart pixel array 118, photographic film 128 or Noise Compensation algorithm 216 are now described with reference to noise compensation apparatus 108 of system 100 of FIG. 1.

As mentioned hereinabove, the joint power spectrum $I(u,v)$ is:

$$I(u,v)=|R(u,v)|^2+|S(u,v)|^2+R^*(u,v)S(u,v)\exp[-i2\phi(u)]+R(u,v)S^*(u,v)\exp[i2\phi(u)]$$

where the term of interest is the cross correlation term $R^*(u,v)S(u,v)$. It should be noted that the linear phase shift in the frequency domain can be ignored because it merely causes translation of the cross-correlation signal in the space domain. To compensate for noise prevailing within the input scene image, the joint power spectrum can be processed to achieve one of a number of filtering schemes including:

1) a Classical Matched filtering scheme
2) a Wiener filtering scheme
3) a parametric Wiener filtering scheme Generally speaking, these filtering schemes may be implemented for either "a priori" cases or "adaptive" cases depending on whether the noise power spectral density $P_n(u,v)$ is either known or unknown in advance, respectively. In the adaptive cases, the filtering schemes require the knowledge of one or more of the following power spectra: the input scene image $|S(u,v)|^2$, the reference image $|R(u,v)|^2$ and the joint image $I(u,v)$. While in the a priori cases, the knowledge of $I(u,v)$ is required, as well as the knowledge of $|R(u,v)|^2$ in filtering schemes #2, and #3.

Capturing the power spectrum of the input scene image $|S(u,v)|^2$ or that of the reference image $|R(u,v)|^2$ is achieved in a similar manner to the capturing of $I(u,v)$ by CCD 106 except that the image which is not required is temporarily excluded at input plane $P_1$. In other words, to capture $|S(u,v)|^2$, the reference image is temporarily excluded at input plane $P_1$ while to capture $|R(u,v)|^2$, the input scene image is temporarily excluded.

Furthermore, the adaptive filtering schemes require performing one or more mathematical operations thereon. One of the mathematical operations is performing the local spatial averaging operation, denoted $<>$, of either individual power spectra $|S(u,v)|^2$, $|R(u,v)|^2$ and $I(u,v)$ or linear combinations of $|S(u,v)|^2$, $|R(u,v)|^2$ and $I(u,v)$. Local spatial averaging using convolution operators as well as other mathematical operations can be achieved in noise compensation apparatus 108.

Turning now to system 100 of FIG. 2, including smart pixel array 118, the above discussion of the capturing of power spectra $|S(u,v)|^2$, $|R(u,v)|^2$ and $I(u,v)$ and performing one or more mathematical operations including local spatial averaging is achieved in a similar fashion.

Turning now to system 100 of FIG. 3, low resolution CCD 122 is used for capturing local spatial average of power spectra $|S(u,v)|^2$, $|R(u,v)|^2$ and $I(u,v)$ while CCD 106 is used for capturing $I(u,v)$ and, in some cases, also $|R(u,v)|^2$ and/or $|S(u,v)|^2$. Further smoothing may be achieved by noise compensation apparatus 108 in order to achieve a better smoothed version of any of the power spectra $|S(u,v)|^2$, $|R(u,v)_{51}|^2$ and $I(u,v)$ as well as other mathematical operations. A defocusing sub-system, as described with reference to FIG. 3, can replace CCD 122 for providing the local spatial average of power spectra $|S(u,v)|^2$, $|R(u,v)|^2$ and $I(u,v)$.

Turning now to system 126 of FIG. 4, the amplitude transmittance of photographic film 128 is proportional to the reciprocal of $|S(u,v)|^2$ in the case that photographic film 128 is deployed in place of CCD 122 (see FIG. 3) in the recording stage, or to the reciprocal of $<|S(u,v)|^2>$ in the case that photographic film 128 is deployed as the recording media of the defocussing sub-system as described with reference to FIG. 3. For these cases, realizing two of the adaptive estimators, the reference image is temporarily excluded at input plane $P_1$ in the recording stage.

Turning now to system 200 of FIG. 5, all the mathematical operations and power spectra distributions are achieved by suitable algorithms.

It can be readily appreciated that to achieve the Classical Matched filtering scheme, $I(u,v)$ is required to be divided by a compensation factor, in this instance, $P_n(u,v)$ so as to elicit the term $R^*(u,v)S(u,v)/P_n(u,v)$ among other terms, thereby indicating that the operation of Classical Matched filtering has been applied to the input scene image.

In the case that the noise power spectral density $P_n(u,v)$ is known a priori, it can be stored in noise compensation apparatus 108 for on-line, real-time processing of the joint power spectrum. Alternatively, turning to all optical JTC system 126 of FIG. 4, the amplitude transmittance of photographic film 128 can be made proportional to the reciprocal of $P_n(u,v)$.

In the case that $P_n(u,v)$ is not known a priori, an estimate for $P_n(u,v)$ can be provided for achieving adaptive Classical Matched filtering by providing estimators which estimate the noise power spectral density $[P_n(u,v)]$. The estimators require at least one sample function and preferably average more than one sample function taken from historical data. Exemplary estimators include, but are not limited to, any one of the following estimators:

1) $\langle I(u,v) - 2|R(u,v)|^2 \rangle = \langle |N(u,v)|^2 \rangle + 2\text{Real}\langle N(u,v)R^*(u,v) \rangle +$ $2\langle |R(u,v)|^2 \cos[2\phi(u)] \rangle + 2\text{Real}\langle N(u,v)R^*(u,v)\exp[i2\phi(u)] \rangle$ 2) $\langle |S(u,v)|^2 - |R(u,v)|^2 \rangle = \langle |N(u,v)|^2 \rangle + 2\text{Real}\langle N(u,v)R^*(u,v) \rangle$ 3) $|S(u,v)|^2 - |R(u,v)|^2 = |N(u,v)|^2 + 2\text{Real}\{N(u,v)R^*(u,v)\}$ where the term of interest is the noise power spectrum term. The term $|R(u,v)|^2 \cos[2\phi(u)]$ in estimator #1 averages to approximately zero since $|R(u,v)|^2$ varies slowly compared with $\cos[2\phi(u)]$ and the local spatial averaging field covers at least one cycle of $\cos[2\phi(u)]$. All the other terms in the estimators have expected zero values because the noise is assumed to be a zero mean noise. When the stationary input-additive noise is assumed to be a non zero mean noise, the noise can be regarded as a zero mean noise on a constant (DC) level. This constant level in the input plane affects only a small number of points in the Fourier plane such that the reasoning behind the estimation of $P_n(u,v)$ still holds for most frequencies (u,v).

It should be noted that for adaptive Classical Matched filtering, if the calculated estimate of the noise power spectral density is less than a suitably selected small positive quantity $\epsilon$, then the estimate for $P_n(u,v)$ should be the value of $\epsilon$. Furthermore, for both a priori and adaptive Classical Matched filtering, any singular points following the division operation, singular points being defined as those points which have values far greater than their neighbors, should be replaced by other values including, but not limited to, the average value of their neighbors.

Selection between estimators for adaptive Classical Matched filtering depends on a number of factors: the available equipment, real-time requirements, the availability of resources to execute local spatial averaging, etc. Hence, estimator #1 has an advantage over estimators #2 and #3 in that it does not require capturing $|S(u,v)|^2$ for every new input scene image, rendering a saving of one frame time. Estimator #3 has an advantage over estimators #1 and #2 in that it does not require local spatial averaging.

In a similar fashion, to achieve Wiener filtering, the I(u,v) is required to be divided by a compensation factor, in this instance, $[|R(u,v)|^2+P_n(u,v)]$ so as to elicit the term $R^*(u,v)S(u,v)/[|R(u,v)|^2+P_n(u,v)]$ among other terms, thereby indicating that the operation of Wiener filtering has been applied to the input scene image.

In the case that the noise power spectral density $P_n(u,v)$ is known a priori, $[|R(u,v)|^2+P_n(u,v)]$ is stored in noise compensation apparatus 108 for on-line, real-time processing of the joint power spectrum. It should be noted that in contrast to Classical matched filtering, the power spectrum $|R(u,v)|^2$ of the reference image is required.

In the case that $P_n(u,v)$ is not known a priori, then an estimate for $[|R(u,v)|^2+P_n(u,v)]$ can be provided for achieving adaptive Wiener filtering by providing estimators which include an estimation of the noise power spectral density $[P_n(u,v)]$. The estimators require at least one sample function and preferably average more than one sample function taken from historical data. Exemplary estimators include, but are not limited to, any one of the following estimators:

1) $\langle I(u, v) - |R(u, v)|^2 \rangle =$ $\langle |R(u, v)|^2 \rangle + \langle |N(u, v)|^2 \rangle + 2\text{Real}\langle N(u, v)R^*(u, v) \rangle +$ $2\langle |R(u, v)|^2 \cos [2\phi(u)] \rangle + 2\text{Real}\langle N(u, v)R^*(u, v)\exp[i2\phi(u)] \rangle$ 2) $|R(u, v)|^2 + \langle I(u, v) - 2|R(u, v)|^2 \rangle =$ $|R(u, v)|^2 + \langle |N(u, v)|^2 \rangle + 2\text{Real}\langle N(u, v)R^*(u, v) \rangle +$ $2\langle |R(u, v)|^2 \cos [2\phi(u)] \rangle + 2\text{Real}\langle N(u, v)R^*(u, v)\exp[i2\phi(u)] \rangle$ 3) $\langle |S(u, v)|^2 \rangle = \langle |R(u, v)|^2 \rangle + \langle |N(u, v)|^2 \rangle + 2\text{Real}\langle N(u, v)R^*(u, v) \rangle$ 4) $|S(u, v)|^2 = |R(u, v)|^2 + |N(u, v)|^2 + 2\text{Real}\{N(u, v)R^*(u, v)\}$ where the term of interest is the resulting sum of the noise power spectrum term and the reference image power spectrum term. The term $|R(u,v)|^2 \cos[2\phi(u)]$ in estimators #1 and #2 averages to approximately zero since $|R(u,v)|^2$ varies slowly compared with $\cos[2\phi(u)]$ and the local spatial averaging field covers at least one cycle of $\cos[2\phi(u)]$. All other terms in the estimators have expected zero values because the noise is assumed to be a zero mean noise. When the stationary input-additive noise is assumed to be a non zero mean noise, the noise can be regarded as a zero mean noise on a constant (DC) level. This constant level in the input plane affects only a small number of points in the Fourier plane such that the reasoning behind the estimation of $[|R(u,v)|^2+P_n(u,v)]$ still holds for most frequencies (u,v).

It should be noted that for adaptive Wiener filtering, if the calculated estimate is less than $|R(u,v)|^2$, then the estimate for $[|R(u,v)|^2+P_n(u,v)]$ should be the value of $|R(u,v)|^2$. Furthermore, for both a priori and adaptive Wiener filtering, any singular points following the division operation, singular points being defined as those points which have values far greater than their neighbors, should be replaced by other values including, but not limited to, the average value of their neighbors.

Selection between estimators depends on a number of factors: the available equipment, real-time requirements, the availability of resources to execute local spatial averaging, etc. Hence, estimators #1 and #2 have an advantage over estimators #3 and #4 in that they do not require capturing $|S(u,v)|^2$ for every new input scene image, rendering a saving of one frame time. Estimator #4 has an advantage over estimators #1, #2 and #3 in that it does not require local spatial averaging. Furthermore, estimators #3 and #4 have an advantage over estimators #1 and #2 in that they can be implemented as optical components because they can be captured on photographic film.

In a similar fashion, to achieve parametric Wiener filtering, the I(u,v) is required to be divided by a compensation factor, in this instance, $[|R(u,v)|^2+\gamma P_n(u,v)]$ so as to elicit the term $R^*(u,v)S(u,v)/[|R(u,v)|^2+\gamma P_n(u,v)]$ among other terms, thereby indicating that the operation of parametric Wiener filtering has been applied to the input scene image.

In the case that the noise power spectral density $P_n(u,v)$ is known a priori and for a desired $\gamma$, $[|R(u,v)|^2+\gamma P_n(u,v)]$ is stored in noise compensation apparatus 108 for on-line, real-time processing of the joint power spectrum. Similar to Wiener filtering, the power spectrum $|R(u,v)|^2$ of the reference image is required.

In the case that $P_n(u,v)$ is not known a priori, then an estimate for $[|R(u,v)|^2+\gamma P_n(u,v)]$ can be provided for achieving adaptive parametric Wiener filtering by providing estimators which include an estimation of the noise power spectral density $[P_n(u,v)]$. The estimators require at least one sample function and preferably average more than one sample function taken from historical data. Exemplary estimators include, but are not limited to, any one of the following estimators:

1) $|R(u, v)|^2 + \gamma\langle I(u, v) - 2|R(u, v)|^2\rangle = |R(u, v)|^2 + \gamma\langle |N(u, v)|^2 \rangle + 2\gamma\text{Real}$ $\langle N(u, v)R^*(u, v) \rangle + 2\gamma\langle |R(u, v)|^2 \cos [2\phi(u)] \rangle +$ $2\gamma\text{Real}\langle N(u, v)R^*(u, v)\exp[i2\phi(u)] \rangle$ 2) $|R(u, v)|^2 + \gamma\langle |S(u, v)|^2 - |R(u, v)|^2 \rangle = |R(u, v)|^2 +$ $\gamma\langle |N(u, v)|^2 \rangle + 2\gamma\text{Real}\langle N(u, v)R^*(u, v) \rangle$ 3) $|R(u, v)|^2 + \gamma(|S(u, v)|^2 - |R(u, v)|^2) = |R(u, v)|^2 +$ $\gamma|N(u, v)|^2 + 2\gamma\text{Real}\{N(u, v)R^*(u, v)\}$ where the resulting sum of the noise power spectrum term multiplied by $\gamma$ and the reference image power spectrum term is the term of interest. The term $|R(u,v)|^2 \cos [2\phi(u)]$ in estimator #1 averages to approximately zero since $|R(u,v)|^2$ varies slowly compared with $\cos[2\phi(u)]$ and the local spatial averaging field covers at least one cycle of $\cos[2\phi(u)]$. The other terms in the estimators have expected zero values because the noise is assumed to be a zero mean noise. When the stationary input-additive noise is assumed to be a non zero mean noise, the noise can be regarded as a zero mean noise on a constant (DC) level. This constant level in the input plane affects only a small number of points in the Fourier plane such that the reasoning behind the estimation of $[|R(u,v)|^2 + \gamma P_n(u,v)]$ still holds for most frequencies $(u,v)$.

It should be noted that for adaptive parametric Wiener filtering, if the calculated estimate is less than $|R(u,v)|^2$, then the value of $|R(u,v)|^2$ should be used as the estimate for $[|R(u,v)|^2 + \gamma P_n(u,v)]$. Furthermore, for both a priori and adaptive parametric Wiener filtering, any singular points following the division operation, singular points being defined as those points which have values far greater than their neighbors, should be replaced by other values including, but not limited to, the average value of their neighbors.

Selection between estimators depends on a number of factors: the available equipment, real-time requirements, the availability of resources to execute local spatial averaging, etc. Hence, estimator #1 has an advantage over estimators #2 and #3 in that it does not require capturing $|S(u,v)|^2$ for every new input scene image, rendering a saving of one frame time. Estimator #3 has an advantage over estimators #1 and #2 in that it does not require local spatial averaging.

Figure 6:
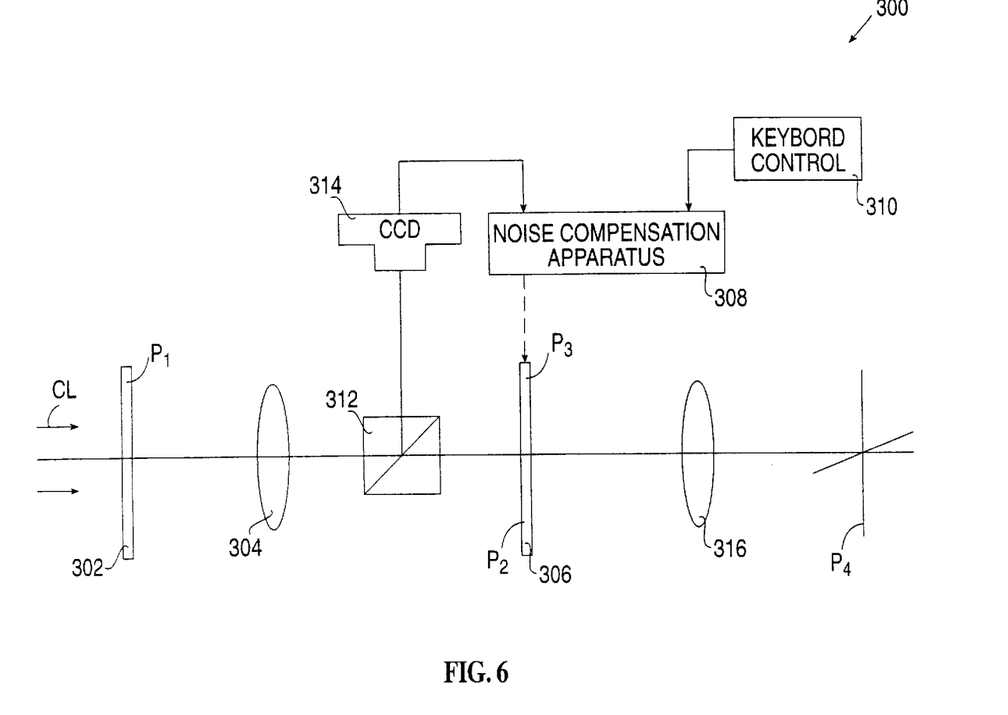
FIG. 6 is a schematic illustration of a preferred embodiment of a hybrid opto-electronic frequency plane correlator pattern recognition and localization system constructed and operative according to the teachings of the present invention.

With reference now to FIG. 6, the schematic illustration illustrates a preferred embodiment of a hybrid opto-electronic frequency plane correlator (FPC) pattern recognition and localization system, generally designated 300, constructed and operative according to the teachings of the present invention.

Plane $P_1$ is the input plane of FPC system 300 at which a SLM 302 is employed for displaying an input scene image. As before, the 2D input scene image can include, but is not limited to: an industrial object, a character, and the like. Similarly, 1D information may include, but is not limited to, time signals, for example, speech, video signals, and the like and spatial signals, for example, a Barcode signal. The input scene image is illuminated by coherent light CL and is Fourier transformed by a Fourier transform device 304 to provide a Fourier transform of the input scene image at a plane $P_2$. Fourier transform device 304 is preferably an optical lens.

It is a particular feature of the present invention that the Fourier transform of the input scene image illuminates a SLM 306 on which there is displayed an adaptive frequency plane mask for compensating for noise prevailing within the input scene image. It should be noted that the adaptive frequency plane mask preferably includes the spatial filter synthesized using the reference image. However, the spatial filter can also be deployed as a discrete component in registration with the adaptive frequency plane mask. In both cases, the adaptive frequency plane mask as provided by SLM 306 is regulated by a noise compensation apparatus 308 including a keyboard control interface 310.

System 300 further includes a beam splitter 312 for reflecting a portion of the light from lens 304 onto a CCD 314 to provide the power spectrum of either the input scene image or the reference image to noise compensation apparatus 308 depending on which input object is present at plane $P_1$. SLM 306 displays, through illumination by the input scene image Fourier transform, the product of the Fourier transform of the input scene image and the adaptive frequency plane mask at a plane $P_3$. The noise compensated product is Fourier transformed by a Fourier transform device 316 to provide a correlation signal at a plane $P_4$. Again, Fourier transform device 316 is preferably an optical lens.

As before, the processing performed by noise compensation apparatus 308 depends on a number of factors including the preferred correlation performance criteria, for example, noise tolerance, peak sharpness, the application at hand and the like. According to the teachings of the present invention, there are proposed several novel filtering schemes for compensating for noise prevailing within the input scene image as will be described hereinbelow. Broadly speaking, the novel filtering schemes can be classified as providing a Classical Matched filtering scheme, a Wiener filtering scheme or a parametric Wiener filtering scheme. However, in this case, the novel filtering schemes treat noise with unknown a priori power spectral density only since corresponding schemes for noise with known a priori power spectral density are known in the art.

Alternatively, a low resolution CCD can replace CCD 314 for providing local spatial averaging of power spectra $|S(u,v)|^2$ and $|R(u,v)|^2$ to noise compensation apparatus 308 which may additionally provide further smoothing of the local spatial averaged function. Still again, a defocusing sub-system (not shown) can replace CCD 314 for providing the local spatial averaging of power spectra $|S(u,v)|^2$ and $|R(u,v)|^2$. Such a sub-system may require additional components including a fine-ground glass. For further description of a defocusing sub-system, refer to an article entitled "Method for multi-level threshold of binarization in a hybrid joint Fourier transform correlator" as referenced hereinabove.

Figure 7:
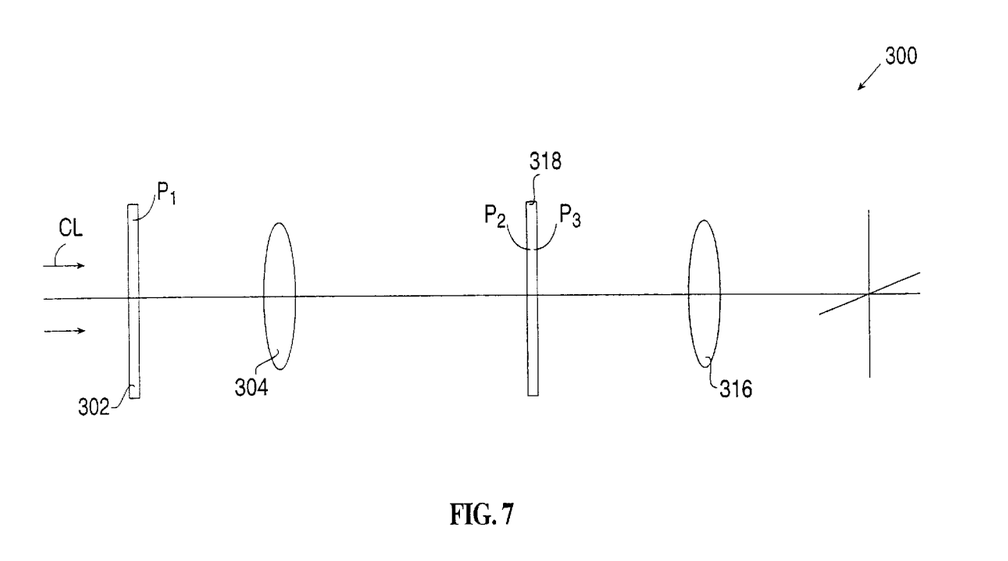
FIG. 7 is a schematic illustrations of a second embodiment of the hybrid opto-electronic frequency plane correlator pattern recognition and localization system of FIG. 6.

Turning now to FIG. 7, FPC pattern recognition and localization system 300 includes a transmission reading mode smart pixel array 318 to replace SLM 306, noise compensation apparatus 308 and CCD 314, thereby obviating the need for beam splitter 312. For further information on smart pixel arrays, reference is made to the above-mentioned article entitled "Smart Spatial Light Modulators using Liquid Crystals on Silicon" which is included by reference as if set forth fully herein.

Figure 8:
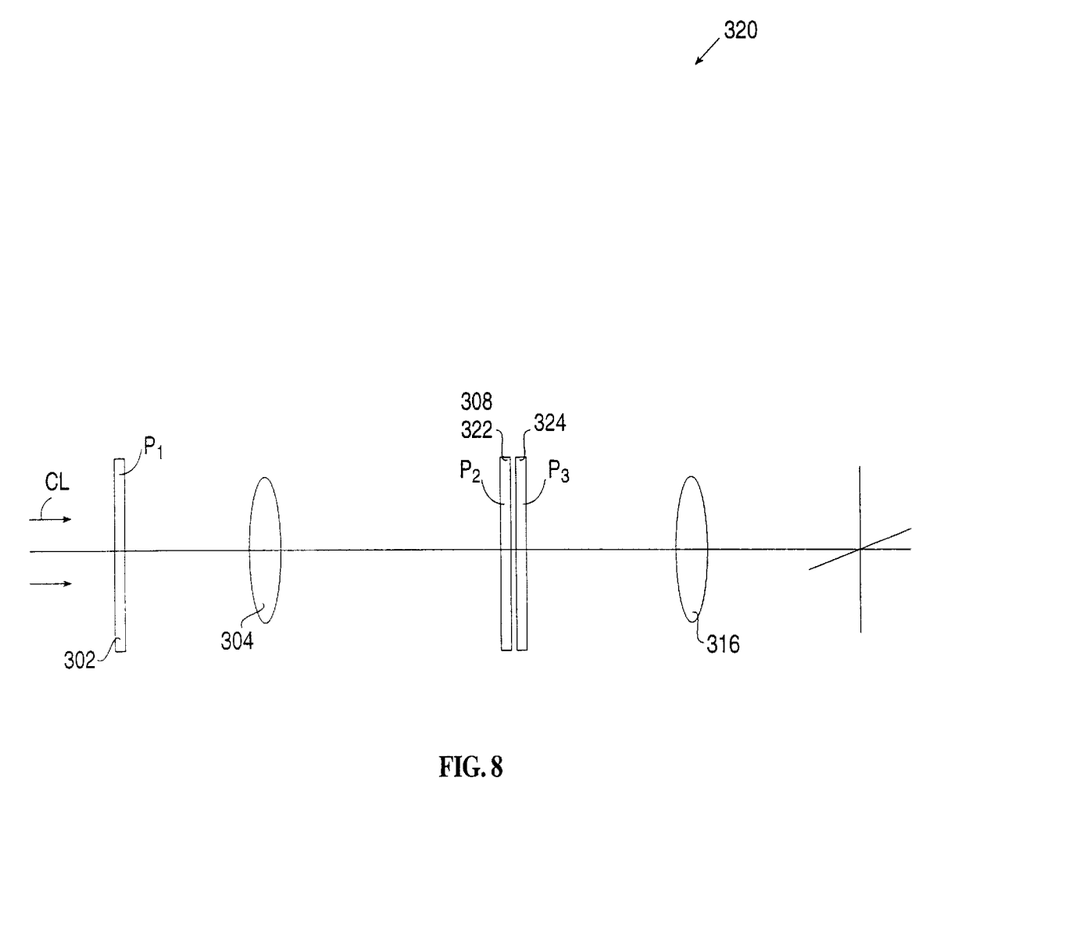
FIG. 8 is a schematic illustration of a preferred all optical implementation of a frequency plane correlator pattern recognition and localization system constructed and operative according to the teachings of the present invention.

Turning now to FIG. 8, the schematic illustration depicts an all-optical implementation of a FPC pattern recognition and localization system, generally designated 320, constructed and operative according to the teachings of the present invention. System 320 is applicable only for particular estimators as described hereinbelow. System 320 employs noise compensation apparatus 308 in the form of a photographic film, additionally designated 322 for the sake of clarity, and a spatial filter 324, synthesized using the reference image, deployed at the focal plane of Fourier transform device 304. Photographic film 322 is preferably of appropriate contrast such that its amplitude transmittance is proportional to the reciprocal of incident recording light intensity. Photographic film 322 and spatial filter 324 display through illumination by the input scene image Fourier transform the noise compensated Fourier transform product at plane $P_3$. Alternatively, spatial filter 324 can be replaced by an electrically addressed transmission reading mode SLM as known in the art. For reasons to become apparent hereinbelow, film 322 is prepared in advance for every new input scene image for compensating for noise prevailing in an input scene image.

Figure 9:
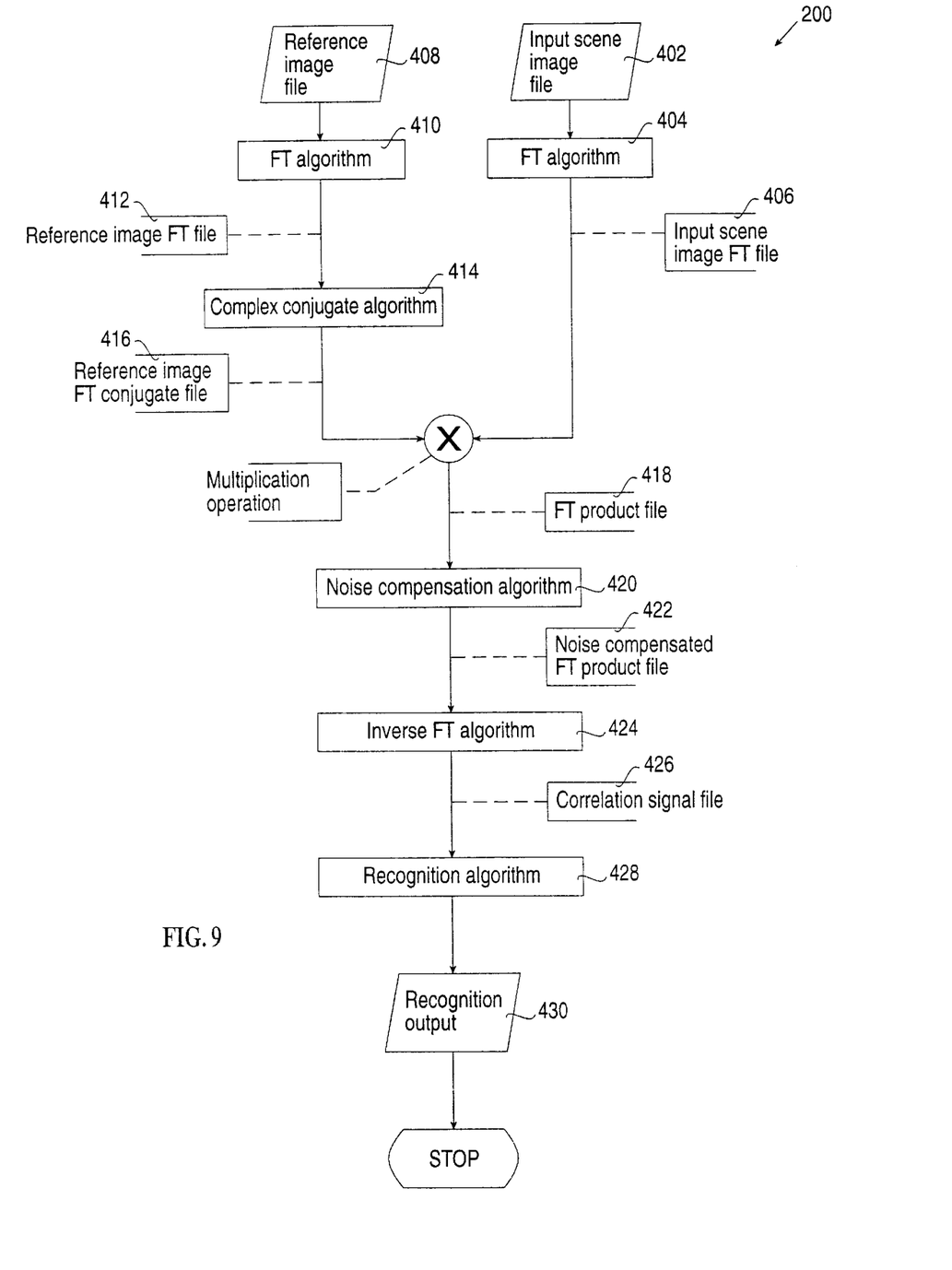
FIG. 9 is a block diagram of a preferred fully digital implementation of a frequency plane correlator pattern recognition and localization system constructed and operative according to the teachings of the present invention.

With reference now to FIG. 9, the flow chart shows a digital implementation of a frequency plane correlator pattern recognition and localization system, generally designated 400, constructed and operative according to the teachings of the present invention. In principle, as will be described in greater detail hereinbelow, the optical components, the opto-electronic components, the electro-optic components, and the electronic components of system 300 of FIG. 6 are implemented as algorithms while the images, functions and distributions are provided as digital files. As well known in the art, the algorithms can be provided as software packages or as hardware components.

Hence, the input scene image is provided as a digital Input Scene Image file 402. Input Scene Image file 402 is fed to a Fourier Transform algorithm 404 which processes Input Scene Image file 402 to provide an Input Scene Image Fourier Transform file 406. In the same fashion, the reference image is provided as a digital Reference Image file 408. Reference Image file 408 is fed to Fourier Transform algorithm 410 to provide a Reference Image Fourier Transform file 412. Reference Image Fourier Transform file 412 is fed to a Complex Conjugate algorithm 414 to provide a Reference Image Fourier Transform Conjugate (FT$^*$) file 416. Input Scene Image Fourier Transform file 406 and Reference Image Fourier Transform Conjugate (FT$^*$) file 416 are multiplied pixel-by-pixel to provide a Fourier Transform Product file 418. In a similar fashion to system 300 of FIG. 6, Fourier Transform Product file 418 is fed to a Noise Compensation algorithm 420 for processing to provide a Noise Compensated Fourier Transform Product file 422. Typically, Noise Compensation algorithm 420 includes one or more sub-routines for providing an estimate for the desired compensation factor in cases where the noise spectral characteristics are unknown a priori. Noise Compensation algorithm 420 also ensures that the Noise Compensated Fourier Transform Product file 422 does not include singular values resulting from a division operation included in the algorithm.

Noise Compensated Fourier Transform Product file 422 is fed to an Inverse Fourier Transform algorithm 424 to provide a Correlation Signal file 426 which includes pattern recognition and localization information. Correlation Signal file 426 is typically analyzed by a Recognition algorithm 428 which is designed to detect correlation signals and localize correlation peaks, thus providing a recognition output 430.

The novel filtering schemes of the present invention as implemented by noise compensation apparatus 308, smart pixel array 318, photographic film 322 or Noise Compensation algorithm 420 are now described with reference to noise compensation apparatus 308 of system 300 of FIG. 6.

As mentioned hereinabove, adaptive frequency plane mask on SLM 306 includes the term R$^*$(u,v). To adaptively compensate for noise prevailing within the input scene image, the filtering function of adaptive frequency plane mask on SLM 306 can be designed to achieve one of a number of filtering schemes including:

1) adaptive Classical Matched filtering
2) adaptive Wiener filtering
3) adaptive parametric Wiener filtering Generally speaking, the filtering schemes require the knowledge of the input scene image power spectrum $|S(u,v)|^2$ and in a portion of the cases also the reference image power spectrum $|R(u,v)|^2$ as well as performing one or more mathematical operations thereon. Capturing the power spectrum of the input scene image $|S(u,v)|^2$ or that of the reference image $|R(u,v)|^2$ is achieved by CCD 314 in the presence of either the input scene image or the reference image at input plane P$_1$, respectively.

One of the mathematical operations required is performing the local spatial averaging operation, denoted < >, of either individual power spectra $|S(u,v)|^2$ and $|R(u,v)|^2$ or linear combinations of $|S(u,v)|^2$ and $|R(u,v)|^2$. Local spatial averaging using convolution operators as well as other mathematical operations can be achieved in noise compensation apparatus 308.

Alternatively, a low resolution CCD can be used in place of CCD 314 for capturing local spatial average of power spectra $|S(u,v)|^2$ and $|R(u,v)|^2$. Further smoothing may be achieved by noise compensation apparatus 308 in order to achieve a better smoothed version of the power spectra $|S(u,v)|^2$ and $|R(u,v)|^2$. A defocusing sub-system, as described with reference to FIG. 6, can replace the low resolution CCD for providing the local spatial average of power spectra $|S(u,v)|^2$ and $|R(u,v)|^2$.

Turning now to system 300 of FIG. 7, including smart pixel array 318, the above discussion of the capturing of power spectra $|S(u,v)|^2$ and $|R(u,v)|^2$ and performing one or more mathematical operations including local spatial averaging is achieved in a similar fashion.

Turning now to system 320 of FIG. 8, the amplitude transmittance of photographic film 322 is proportional to the reciprocal of $|S(u,v)|^2$ in the case that photographic film 322 is deployed in place of CCD 314 (see FIG. 6) in the recording stage, or to the reciprocal of <$|S(u,v)|^2$> in the case that photographic film 322 is deployed as the recording media of the defocussing sub-system as described with reference to FIG. 6.

Turning now to system 400 of FIG. 9, all the mathematical operations and power spectra distributions are achieved by suitable algorithms.

As well known in the art, to achieve the Classical Matched filtering scheme, the term R$^*$(u,v) is required to be divided by a compensation factor, in this instance, P$_n$(u,v) so as to elicit the Classical Matched filter function R$^*$(u,v)/P$_n$(u,v). After multiplication in the Fourier plane by the input scene image Fourier transform S(u,v), the cross correlation term R$^*$(u,v)S(u,v)/P$_n$(u,v) is arrived at, thereby indicating that the operation of Classical Matched filtering has been applied to the input scene image.

Hence, it can be readily appreciated that in the case that P$_n$(u,v) is not known a priori, an estimate for P$_n$(u,v) can be provided for achieving adaptive Classical Matched filtering by providing estimators which estimate the noise power spectral density [P$_n$(u,v)]. The estimators require at least one sample function and preferably average more than one sample function taken from historical data. Exemplary estimators include, but are not limited to, one of the following estimators:

$$<|S(u,v)|^2-|R(u,v)|^2>=<|N(u,v)|^2>+2\text{Real}<N(u,v)R^*(u,v)> \qquad 1)$$

$$|S(u,v)|^2-|R(u,v)|^2=|N(u,v)|^2+2\text{Real}\{N(u,v)R^*(u,v)\} \qquad 2)$$

where the term of interest is the noise power spectrum term. The other terms in these estimators have expected zero values because the noise is assumed to be a zero mean noise. When the stationary input-additive noise is assumed to be a non zero mean noise, the noise can be regarded as a zero mean noise on a constant (DC) level. This constant level in the input plane affects only a small number of points in the Fourier plane, thus the above reasoning for the estimation of P$_n$(u,v) still holds for most frequencies (u,v). Both estimators #1 and #2 require capturing $|S(u,v)|^2$ for every new input scene image. However, estimator #2 has an advantage over estimator #1 in that the local spatial averaging operation is not required.

It should be noted that for adaptive Classical Matched filtering, if the calculated estimate is less than a suitably selected small positive quantity ε, then the value ε should be used as the estimate for $P_n(u,v)$. Furthermore, any singular points following the division operation, singular points being defined as those points which have values far greater than their neighbors, should be replaced by other values including, but not limited to, the average value of their neighbors.

In a similar fashion, as well known in the art, to achieve the Wiener filtering scheme, the term $R^*(u,v)$ is required to be divided by a compensation factor, in this instance, $[|R(u,v)|^2+P_n(u,v)]$ so as to elicit the Wiener filter function $R^*(u,v)/[|R(u,v)|^2+P_n(u,v)]$. After multiplication in the Fourier plane by the input scene image Fourier transform $S(u,v)$, the cross correlation term $R^*(u,v)S(u,v)/[|R(u,v)|^2+P_n(u,v)]$ is arrived at, thereby indicating that the operation of Wiener filtering has been applied to the input scene image. Hence, it can be readily appreciated that in the case that $P_n(u,v)$ is not known a priori, then an estimate for $[|R(u,v)|^2+P_n(u,v)]$ can be provided for achieving adaptive Wiener filtering by providing estimators which include an estimation of the noise power spectral density $[P_n(u,v)]$. The estimators require at least one sample function and preferably average more than one sample function taken from historical data. Exemplary estimators include, but are not limited to, one of the following estimators:

$$<|S(u,v)|^2>=<|R(u,v)|^2>+<|N(u,v)|^2>+2\mathrm{Real}<N(u,v)R^*(u,v)> \quad 1)$$

$$|S(u,v)|^2=|R(u,v)|^2+|N(u,v)|^2+2\mathrm{Real}\{N(u,v)R^*(u,v)\} \quad 2)$$

where the term of interest is the resulting sum of the noise power spectrum term and the reference image power spectrum term. The other terms in these estimators have expected zero values because the noise is assumed to be a zero mean noise. When the stationary input-additive noise is assumed to be a non zero mean noise, the noise can be regarded as a zero mean noise on a constant (DC) level. This constant level in the input plane affects only a small number of points in the Fourier plane, thus the above reasoning for the estimation of $[|R(u,v)|^2+P_n(u,v)]$ still holds for most frequencies $(u,v)$. Both estimators #1 and #2 require capturing $|S(u,v)|^2$ for every new input scene image. However, as before, estimator #2 has an advantage over estimator #1 in that the local spatial averaging operation is not required. It should be noted that both estimators #1 and #2 can be implemented as optical components because they can be captured on photographic film.

It should be noted that for adaptive Wiener filtering, if the calculated estimate is less than $|R(u,v)|^2$, then the estimate for $[|R(u,v)|^2+P_n(u,v)]$ should be the value of $|R(u,v)|^2$. Furthermore, any singular points following the division operation, singular points being defined as those points which have values far greater than their neighbors, should be replaced by other values including, but not limited to, the average value of their neighbors.

In a similar fashion, as well known in the art, to achieve the parametric Wiener filtering scheme, the term $R^*(u,v)$ is required to be divided by a compensation factor, in this instance, $[|R(u,v)|^2+\gamma P_n(u,v)]$ for a desired $\gamma$ so as to elicit the parametric Wiener filter function $R^*(u,v)/[|R(u,v)|^2+\gamma P_n(u,v)]$. After multiplication in the Fourier plane by the input scene image Fourier transform $S(u,v)$, the cross correlation term $R^*(u,v)S(u,v)/[|R(u,v)|^2+\gamma P_n(u,v)]$ is arrived at, thereby indicating that the operation of parametric Wiener filtering has been applied to the input scene image.

Hence, it can be readily appreciated that in the case that $P_n(u,v)$ is not known a priori, then an estimate for $[|R(u,v)|^2+\gamma P_n(u,v)]$ can be provided for achieving adaptive parametric Wiener filtering by providing estimators which include an estimation of the noise power spectral density $[P_n(u,v)]$. The estimators require at least one sample function and preferably average more than one sample function taken from historical data. Exemplary estimators include, but are not limited to, one of the following estimators:

$$|R(u,v)|^2+\gamma<|S(u,v)|^2-|R(u,v)|^2>=|R(u,v)|^2+\gamma<|N(u,v)|^2>+2\gamma\mathrm{Real}<N(u,v)R^*(u,v)> \quad 1)$$

$$|R(u,v)|^2+\gamma(|S(u,v)|^2-|R(u,v)|^2)=|R(u,v)|^2+\gamma|N(u,v)|^2+2\gamma\mathrm{Real}\{N(u,v)R^*(u,v)\} \quad 2)$$

where the term of interest is the resulting sum of the noise power spectrum term multiplied by parameter $\gamma$ and the reference image power spectrum term. The other terms in these estimators have expected zero values because the noise is assumed to be a zero mean noise. When the stationary input-additive noise is assumed to be a non zero mean noise, the noise can be regarded as a zero mean noise on a constant (DC) level. This constant level in the input plane affects only a small number of points in the Fourier plane, thus the above reasoning for the estimation of $[|R(u,v)|^2+\gamma P_n(u,v)]$ still holds for most frequencies $(u,v)$. Both estimators #1 and #2 require capturing $|S(u,v)|^2$ for every new input scene image. However, as before, estimator #2 has an advantage over estimator #1 in that the local spatial averaging operation is not required.

It should be noted that for adaptive parametric Wiener filtering, if the calculated estimate is less than $|R(u,v)|^2$, then the value of $|R(u,v)|^2$ should be used as the estimate for $[|R(u,v)|^2+\gamma P_n(u,v)]$. Furthermore, any singular points following the division operation, singular points being defined as those points which have values far greater than their neighbors, should be replaced by other values including, but not limited to, the average value of their neighbors.

While the invention has been described with respect to a limited number of embodiments, it will be appreciated that many variations, modifications and other applications of the invention may be made.

What is claimed is:

1. A joint transform correlator for pattern recognition and localization, the correlator comprising:
    (a) image providing means for providing a joint image of a reference image and an input scene image at the input plane of the correlator;
    (b) first Fourier transform means for receiving said joint image and for providing a Fourier transform interference field of the reference image and the input scene image;
    (c) square law means for receiving said Fourier transform interference field and for providing a joint power spectrum;
    (d) noise compensation means for compensating for noise prevailing within said input scene image by processing said joint power spectrum to produce a noise compensated joint power spectrum, said noise compensation means providing processing of said joint power spectrum according to a scheme selected from the group of schemes consisting of:
        (i) Classical Matched filtering schemes that compensate for noise through adaptive estimation of an unknown a priori noise power spectral density,
        (ii) Wiener filtering schemes, and
        (iii) parametric Wiener filtering schemes; and
    (e) second Fourier transform means for receiving said noise compensated joint power spectrum and for providing a noise tolerant correlation signal so as to enhance pattern recognition and localization capabilities.

2. The correlator as in claim 1, wherein each of said Classical Matched filtering schemes includes estimating said unknown a priori noise power spectral density using one estimator selected from the group of estimators consisting of: $<I-2|R|^2>$, $<|S|^2-|R|^2>$ and $|S|^2-|R|^2$, wherein I is said joint power spectrum, $|R|^2$ is a power spectrum of said reference image, $|S|^2$ is a power spectrum of said input scene image, and $<\,>$ denotes a local spatial average.

3. The correlator as in claim 1, wherein each of said Wiener filtering schemes compensates for noise with a known a priori power spectral density.

4. The correlator as in claim 1, wherein each of said Wiener filtering schemes compensates for noise through adaptive estimation of a distribution including an unknown a priori noise power spectral density.

5. The correlator as in claim 4, wherein each of said Wiener filtering schemes includes estimating said distribution using one estimator selected from the group of estimators consisting of: $<I-|R|^2>$, $|R|^2+<I-2|R|^2>$, $<|S|^2>$, and $|S|^2$, wherein I is said joint power spectrum, $|R|^2$ is a power spectrum of said reference image, $|S|^2$ is a power spectrum of said input scene image, and $<\,>$ denotes a local spatial average.

6. The correlator as in claim 1, wherein each of said parametric Wiener filtering schemes compensates for noise with a known a priori power spectral density.

7. The correlator as in claim 1, wherein each of said parametric Wiener filtering schemes compensates for noise through adaptive estimation of a distribution including an unknown a priori noise power spectral density.

8. The correlator as in claim 7, wherein each of said parametric Wiener filtering schemes includes estimating said distribution using one estimator selected from the group of estimators consisting of: $|R|^2+\gamma<I-2|R|^2>$, $|R|^2+\gamma<|S|^2-|R|^2>$, and $|R|^2+\gamma(|S|^2-|R|^2)$, wherein I is said joint power spectrum, $|R|^2$ is a power spectrum of said reference image, $|S|^2$ is a power spectrum of said input scene image, $\gamma$ is a filtering parameter and $<\,>$ denotes a local spatial average.

9. The correlator as in claim 1 implemented as an all-optical system.

10. The correlator as in claim 1 implemented as a hybrid opto-electronic system.

11. The correlator as in claim 1 implemented as an electronic fully-digital system.

12. A method for pattern recognition and localization using a joint transform correlator, the method comprising the steps of:
  (a) providing a joint image of a reference image and an input scene image at the input plane of the correlator;
  (b) receiving the joint image and providing a Fourier transform interference field of the reference image and the input scene image;
  (c) receiving the Fourier transform interference field and providing a joint power spectrum;
  (d) compensating for noise prevailing within the input scene image by processing the joint power spectrum according to a scheme selected from the group of schemes consisting of:
    (i) Classical Matched filtering schemes that compensate for noise through adaptive estimation of an unknown a priori noise power spectral density,
    (ii) Wiener filtering schemes, and
    (iii) parametric Wiener filtering schemes to produce a noise compensated joint power spectrum; and
  (e) receiving the noise compensated joint power spectrum and providing a noise tolerant correlation signal so as to enhance pattern recognition and localization capabilities.

13. The method as in claim 12 implemented on an all-optical system.

14. The method as in claim 12 implemented on a hybrid opto-electronic system.

15. The method as in claim 12 implemented on an electronic fully-digital system.

* * * * *